United States Patent [19]
Galloway

[11] Patent Number: 5,463,743
[45] Date of Patent: Oct. 31, 1995

[54] METHOD OF IMPROVING SCSI OPERATIONS BY ACTIVELY PATCHING SCSI PROCESSOR INSTRUCTIONS

[75] Inventor: William C. Galloway, Houston, Tex.

[73] Assignee: Compaq Computer Corp., Houston, Tex.

[21] Appl. No.: 160,585

[22] Filed: Dec. 1, 1993

Related U.S. Application Data

[62] Division of Ser. No. 955,845, Oct. 2, 1992.

[51] Int. Cl.$^6$ ................................................. G06F 13/10
[52] U.S. Cl. .................. 395/285; 364/238.3; 364/941.1; 364/DIG. 1; 395/275; 395/375; 395/700; 395/825; 395/885; 395/853; 395/874
[58] Field of Search .................................... 395/275, 325, 395/375, 700

[56] References Cited

U.S. PATENT DOCUMENTS

| | | | |
|---|---|---|---|
| 5,204,951 | 4/1993 | Keener et al. | 395/325 |
| 5,283,872 | 2/1994 | Ohnishi | 395/325 |
| 5,313,588 | 5/1994 | Nagashige et al. | 395/275 |
| 5,347,638 | 9/1994 | Desai et al. | 395/375 |

OTHER PUBLICATIONS

Dynamic Patch Via Invalid Operations, IBM Technical Disclosure Bulletin, vol. 15, No. 4, Sep. 1992, pp. 1248–1250.

Primary Examiner—Ken S. Kim
Attorney, Agent, or Firm—Pravel, Hewitt, Kimball & Krieger

[57] ABSTRACT

A method for improving SCSI controller operations by actively patching SCSI processor instructions. In a first case, tag values assigned to queues for tagged queue operation are a multiple of the SCSI processor jump instruction length. When reselected, the tag value is patched or overwritten as the least significant byte of the address of a jump instruction. The upper bytes point to the beginning of a jump table. Each entry in the jump table is a jump instruction to the sequence for a particular queue or thread. Thus simple entry is made to the desired thread without a conditional branch tree. In a second case, special SCSI operations are directly handled by the host device driver and the SCSI processor only performs conventional data transfers and similar operations. The device driver patches the message length of the SCSI processor code to an illegal value, so that an illegal instruction develops, prompting the host device driver to perform the operation at a register level. This approach allows removal of all special operation conditional branching from the SCSI processor, greatly speeding up operations.

3 Claims, 7 Drawing Sheets

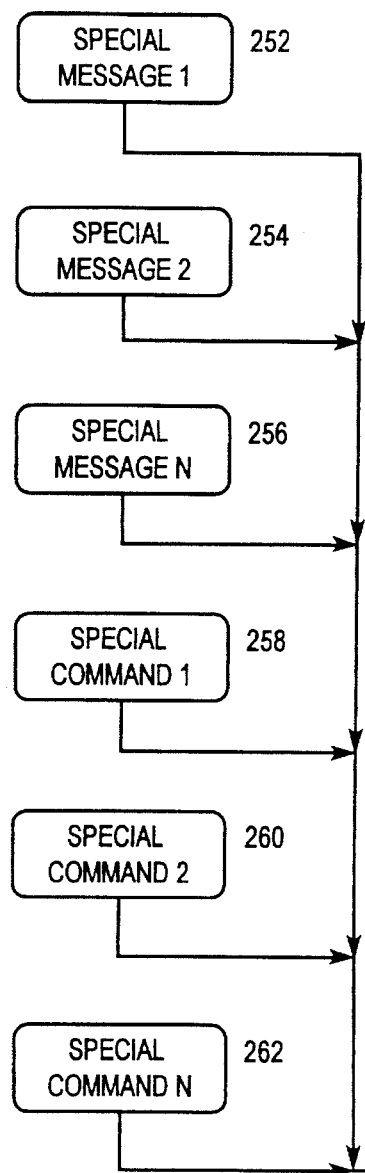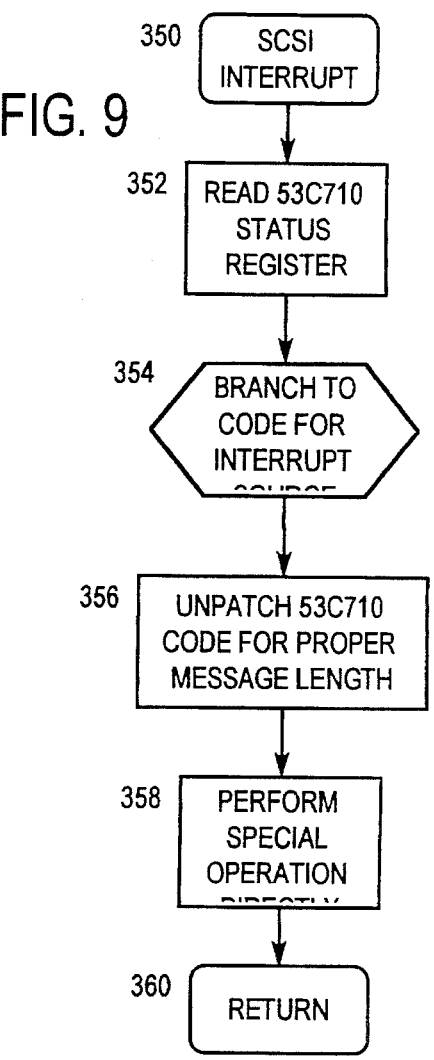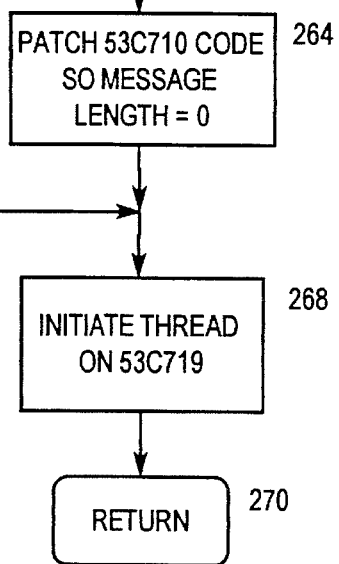
FIG. 6
FIG. 9

METHOD OF IMPROVING SCSI OPERATIONS BY ACTIVELY PATCHING SCSI PROCESSOR INSTRUCTIONS

This is a divisional, of application Ser. No. 07/955,845, filed Oct. 2, 1992.

BACKGROUND OF THE INVENTION

1. Field of the Invention

The invention relates to processing SCSI operations, and more particularly to actively changing processor instructions to remove long conditional branching sequences.

2. Description of the Related Art

Computer systems are becoming more powerful and flexible with each passing moment. These changes are due to numerous factors, including improvements in semiconductor devices such as microprocessors and memory chips, in computer system architectures and in software capabilities.

One way flexibility is increasing, as well as performance in many instances, is by the use of Small Computer System Interface (SCSI) compatible storage devices. SCSI is a standard specification developed by the American National Standard for Information System (ANSI) and has gone through several generations. The current issued specification is SCSI-2, with SCSI-3 under development. The specification, either final or most recent published draft, for SCSI-2, which is hereby incorporated by reference, defines mechanical, electrical and functional requirements for various peripheral devices. The peripheral devices include hard disk drives, CD-ROM drives, tape units, optical drives and others as commonly used with small computers.

One advantage of SCSI is that numerous devices can be connected to a single bus and be accessed through a single controller, with only software device drivers varying between the devices. This allows easy connection of new devices. Combined with the variety of devices, SCSI thus is a very flexible system.

A second advantage of SCSI is that it is a high performance standard. Thus, as it becomes more widely supported, computer system performance will increase. Because of the high performance capabilities, specialized controller integrated circuits have been developed. These chips handle many of the low level complexities of interfacing to the SCSI bus, which is the connection between the controller and the various devices. This reduction to an integrated circuit level improves performance and simplifies the software device drivers which execute on the host computer system. Recent controller chips have become quite advanced. One example is the 53C710 SCSI I/O Processor from NCR Corporation (NCR) of Dayton, Ohio. This device includes a DMA interface to allow movement of data between the SCSI devices and host computer memory without host processor intervention. This provides a large performance increase. The 53C710 further includes a processor specifically designed to perform SCSI operation. This is referred to as a SCRIPTS processor. By incorporation of this processor in the controller, even more functionality can be transferred from the host device drive to the controller, allowing an even greater performance increase of the computer system. Familiarity with the NCR 53C710 SCSI I/O controller or a Similar device and operations on the SCSI bus are assumed in this specification.

One requirement of a processor, such as the SCRIPTS processor in the 53C710, is software or controlling instructions. In using the 53C710, these instructions can be located in dual-port RAM interfaced directly to the 53C710. However, while this option offers high performance, it also increases cost and board space. Alternatively, the 53C710 includes bus master logic capable of accessing host computer main memory directly. The 53C710 can thus also access host computer main memory to obtain its instructions. While there are some delays in obtaining the host bus, this option reduces cost and board space without a severe memory access penalty and so is often used.

When the 53C710 is to be designed into a system or a controller card, certain SCRIPTS language sequences are provided by NCR to allow the controller board or computer system designer to incorporate the device with greatly reduced effort. While the sequences perform the required functions, in some areas performance has been sacrificed. While the SCRIPTS processor is quite capable and well designed for performing SCSI operations, its performance is somewhat reduced in performing certain simple logical operations, such as conditional branching. This creates a problem in some instances.

One problem area relates to providing messages and commands from the computer to the SCSI device. The SCSI specification is very flexible, so that a very large number of options are available for messages and commands. However, some of these messages and commands are special and require very different handling from normal data transfer messages and commands. To resolve this problem, the conventional SCRIPTS sequences for the 53C710 check for these special cases before executing the conventional cases. This checking is done for each operation or thread and is done using a string of conditional branching operations. Thus performance is reduced on every operation.

A second area relates to the use of tagged queuing with the SCSI devices. Tagged queuing allows multiple commands from a single source or initiator to be present in a single device or target. The initiator includes a tag value along with each command. The target disconnects from communication with the controller, performs the operation and reselects the controller to complete the communication, providing the tag value with the return message. The multiple queues and disconnection allows improved efficiency of the SCSI bus. However, a complicating factor is that when the target device indicates completion and reselects the initiator, conventionally the controller, the initiator must stop its current task and determine the proper task or thread to complete. In the case of the conventional SCRIPTS sequences for the 53C710, this meant traversing another conditional branching string, each branch checking to determine if that particular queue or thread was being completed. Again, this process was slow and so performance suffered.

Therefore it would be desirable to resolve these two areas of conditional branching strings to even further improve SCSI operations when using the 53C710 and similar devices.

SUMMARY OF THE INVENTION

A design according to the present invention allows removal of the conditional branching strings in the above cases. In the case of special instructions or operations, those which cannot be handled using a conventional, simple SCRIPTS sequence, the host device driver accesses the memory area reserved for the 53C710 SCRIPTS sequences and modifies one instruction, specifically the message instruction, to an illegal configuration. Preferably the change is to indicate a zero byte long message. When the 53C710 loads this instruction, it is determined to be illegal. The 53C710 then sets an illegal interrupt bit and interrupts the host computer. The device driver in the host computer determines that this is an illegal instruction interrupt, corrects the message length and then instructs the 53C710 to perform the necessary operations of the special case using a series of short SCRIPTS sequences. This patching or altering of the message instruction for special cases allows the removal of the conditional branching string, thus greatly improving performance for normal cases. Overall performance is also greatly improved as the special cases are very infrequent and the time saved by not performing the conditional string greatly exceeds the slightly lengthened time to perform the special cases.

The tagged queue case is handled in a somewhat similar fashion. A jump table is utilized in a reselection sequence. Each entry in the jump table is an instruction to jump or branch to a specific thread representing a specific queue. Entry into this table is made by changing the least. significant byte of a jump instruction, the remaining address pointing to the beginning of the jump table. The change is simplified by directly writing the queue tag value to the instruction location. This is possible because the queue tags are selected to be multiples of the jump instruction length of 8 bytes. Thus all tags are multiples of 8. This allows a direct, simple overwrite to produce a direct jump instruction to the proper jump instruction in the jump table. Thus the conditional branch string is replaced by a move and a jump, the second jump occurring in any case.

Therefore by actively or dynamically changing or altering the instructions processed by the 53C710, the conditional branching strings are removed and performance increased.

BRIEF DESCRIPTION OF THE DRAWINGS

A better understanding of the present invention can be obtained when the following detailed description of the preferred embodiment is considered in conjunction with the following drawings, in which:

FIG. 6 is a flowchart of operations on the host device driver for use in special case determination according to the present invention;

FIG. 9 is a flowchart of host device driver operations upon an interruption by the SCSI controller for special cases according to the present invention.

DETAILED DESCRIPTION OF THE PREFERRED EMBODIMENT

Figure 1:
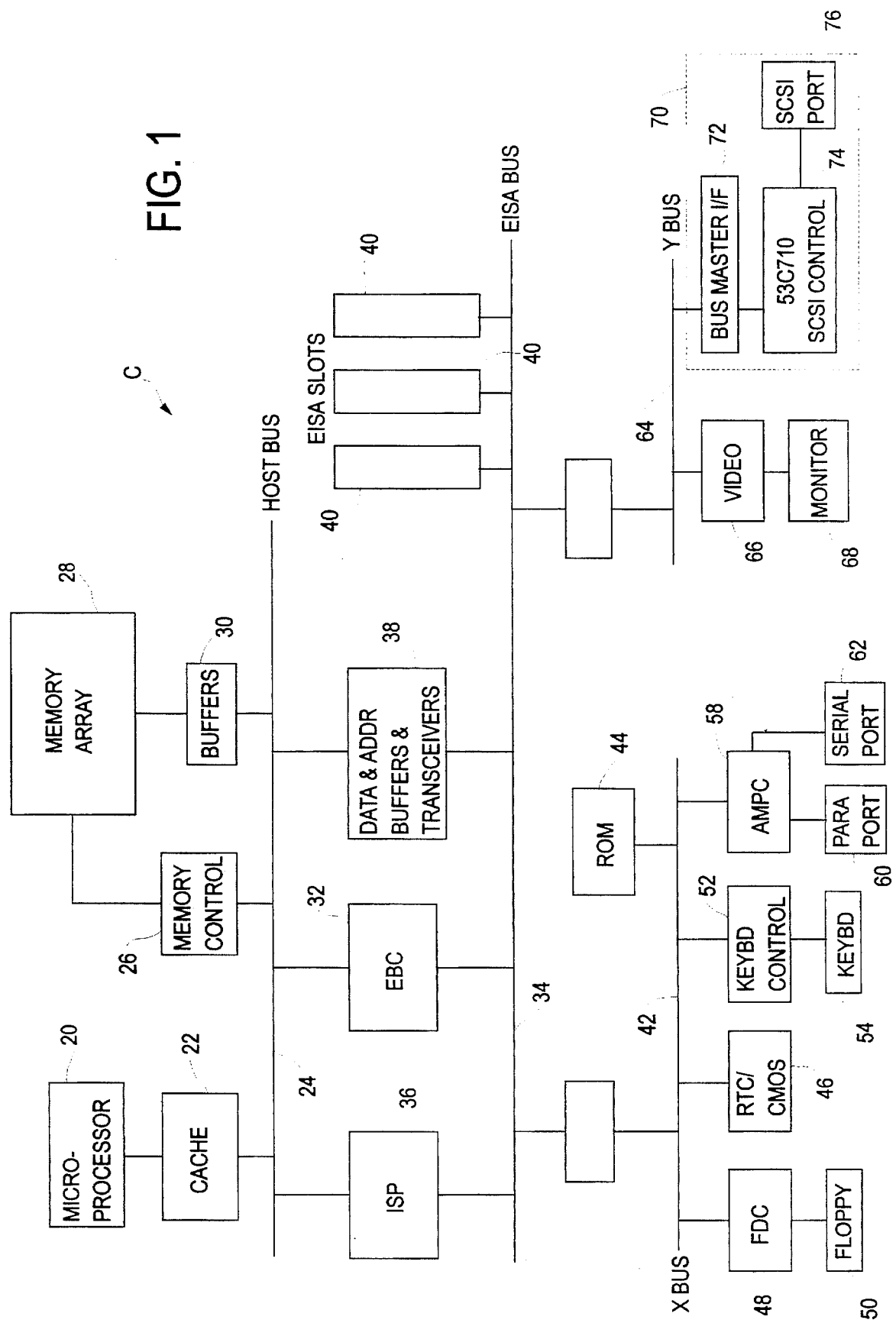
FIG. 1 is a block diagram of a computer system incorporating the present invention.

Referring now to FIG. 1, a computer system C including a SCSI controller capable of operating according to the present invention is shown. A microprocessor 20, preferably an 80486 from Intel Corporation, is connected to a cache controller 22. The cache controller 22 in turn is connected to a host bus 24 which includes address, data and control portions. A memory controller 26 is connected to the host bus 24 to receive and control operate main memory operations. The memory controller 26 is connected to the main memory array 28 of the computer C, with the data from the main memory array 28 going through a data buffer 30 to the host bus 24.

Also connected to the host bus 24 is in an EISA bus controller (EBC) 32 which handles translation of signals between the host bus 24 and an EISA bus 34, the input/output bus preferably used. It is of course understood that other I/O buses could be utilized. The EBC 32 is connected to an integrated system peripheral (ISP) 36 which includes a DMA controller, timers, interrupt controller, EISA bus arbiter and other devices as necessary and common in an EISA system. The ISP 36 is connected to the host bus 24 and the EISA bus 34. In addition, the EBC 32 is connected to a series of address and data latches and transceivers 38 which are connected to the host bus 24 and EISA bus 34 and provide the necessary address and data latching and buffering to allow development of an EISA system. Also connected to the EISA bus 34 are a series of EISA slots 40 which receive interchangeable circuit boards.

Two additional buses are developed from the EISA bus 34. The first of these is referred to as the X bus 42 which is conventionally a 16-bit bus used to connect with the majority of support chips present on system board of the computer system C. For example, these support chips include a read only memory (ROM) 44; a real time clock (RTC) and CMOS memory 46; a floppy disk controller 48, which in turn is connected to a floppy disk drive 50; an 8042 keyboard controller 52, which is in turn connected to a keyboard 54 and a pointing device (not shown); and a multiple peripheral controller (AMPC) 58 which provides a parallel port 60 and a series of serial ports 62. These are devices which are conventional in a small computer system C such as the one shown and are provided to indicate a complete computer and are not necessarily related to the present invention.

A second bus developed from the EISA bus 34 is the Y bus 64, which is preferably a 32-bit bus to allow high data rate transfers to the EISA bus 34. A video controller 66 and its associated monitor 68 are connected to the Y bus 64. Of more interest for the present invention is a SCSI subsystem 70. The SCSI subsystem 70 includes a bus master interface 72, a 53C710 SCSI controller 74 as referenced in the background and a SCSI port 76 which is used to connect to SCSI devices. In the case of the computer system C, the SCSI subsystem 70 is located on the system board as the computer system C preferably includes internal SCSI hard drives for performance reasons.

Figure 2:
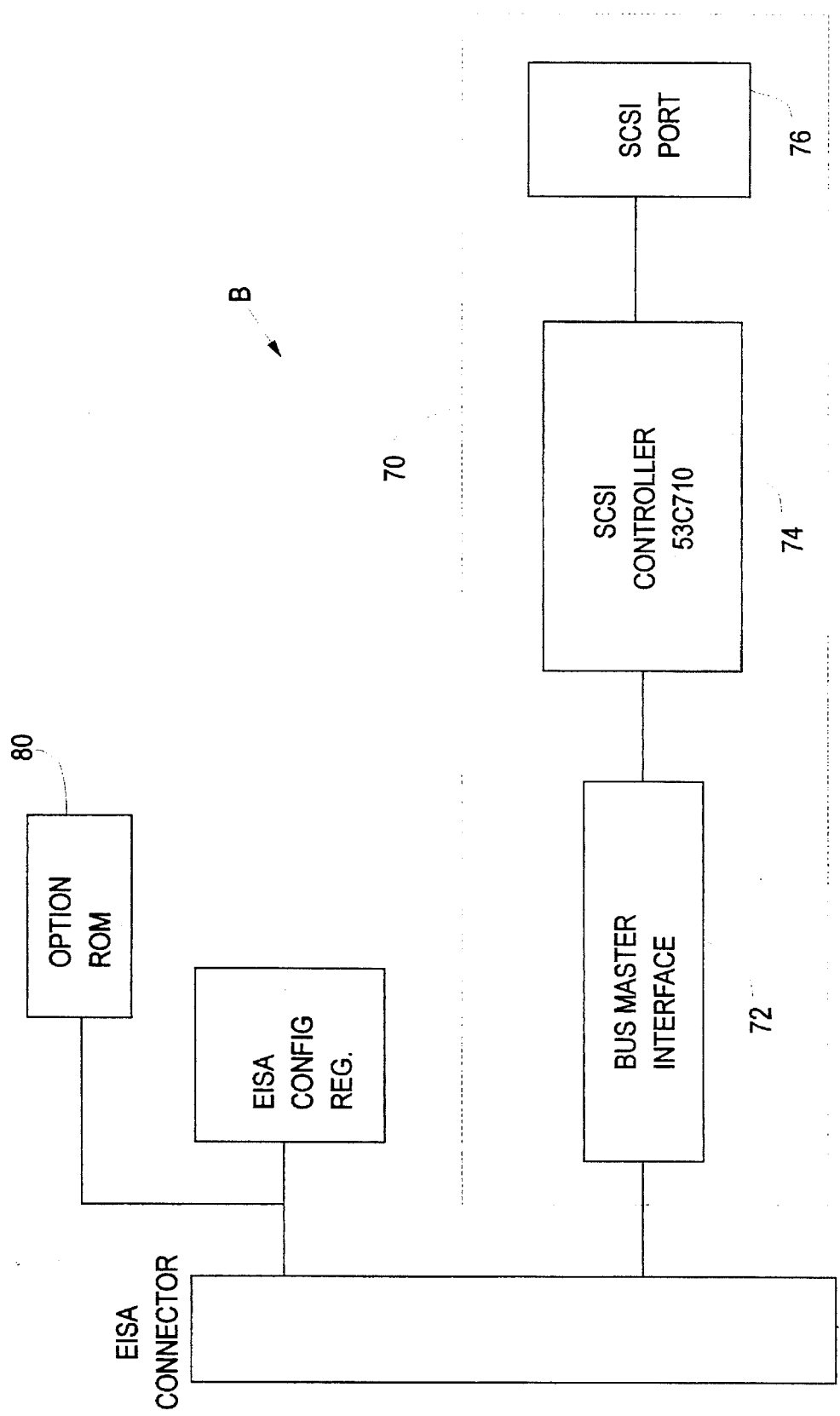
FIG. 2 is a block diagram of a SCSI controller card for use according to the present invention.

Referring now to FIG. 2, a SCSI controller circuit board B is generally shown. Again a SCSI subsystem 70 is located on the board with the SCSI subsystem 70 including a bus master interface 72, a 53C710 SCSI controller 74 and SCSI port 76. The bus master interface 72 is connected to an EISA connector 78 which is received into an EISA slot 40 in a computer such as the computer system C. While the computer system C included proper device driver software located in the ROM 44 for use with the SCSI subsystem 70, an option ROM 80 is utilized on the circuit board B to contain the proper sequences. The sequences in the ROM 44 or 80 related to the SCSI subsystem 70 preferably are the device driver software utilized by the host computer to interface with the SCSI controller 74 and the actual code sequences executed by the 53C710 SCSI controller 74. During boot operations of the computer system C or a computer containing the circuit board B, these 53C710 SCSI controller sequences are downloaded from the option ROM 80 or main ROM 44 into the main memory array 28 of the computer, so that the 53C710 SCSI controller 74 may access the sequences using its bus master interface in the cost reduced version as described in the background. One advantage of this arrangement which is utilized according to the present invention of this memory sharing arrangement is that it allows the host computer to readily change instructions which will be executed by the SCSI controller 74.

It is understood that in an alternate arrangement local memory can be associated with the SCSI controller 74 to contain the 53C710 SCRIPTS sequences. Preferably this memory would be dual ported RAM to allow operation according to the present invention.

Figure 3:
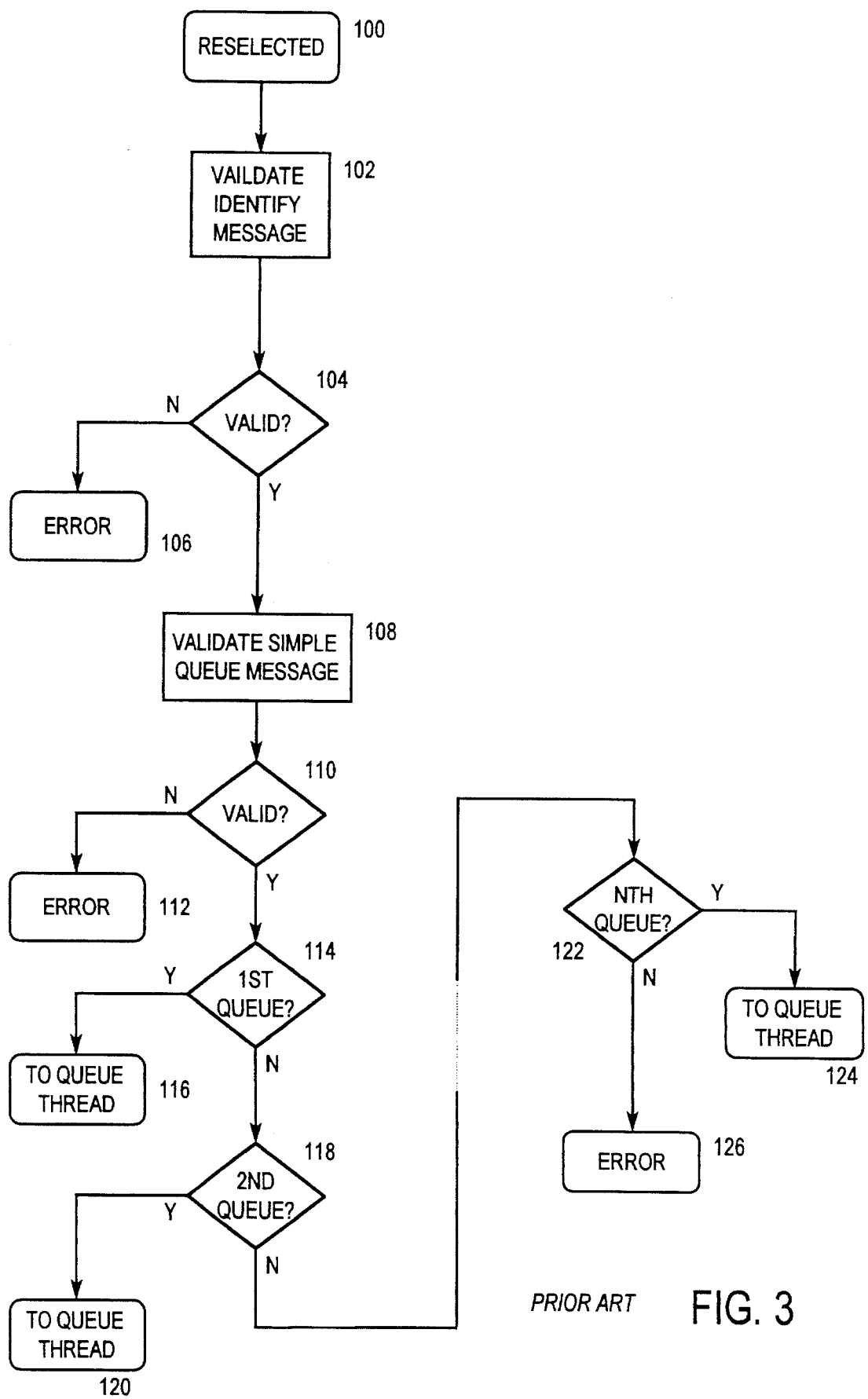
FIG. 3 is a flowchart of operations of the SCSI controller for tagged queues according to the prior art.
Figure 4:
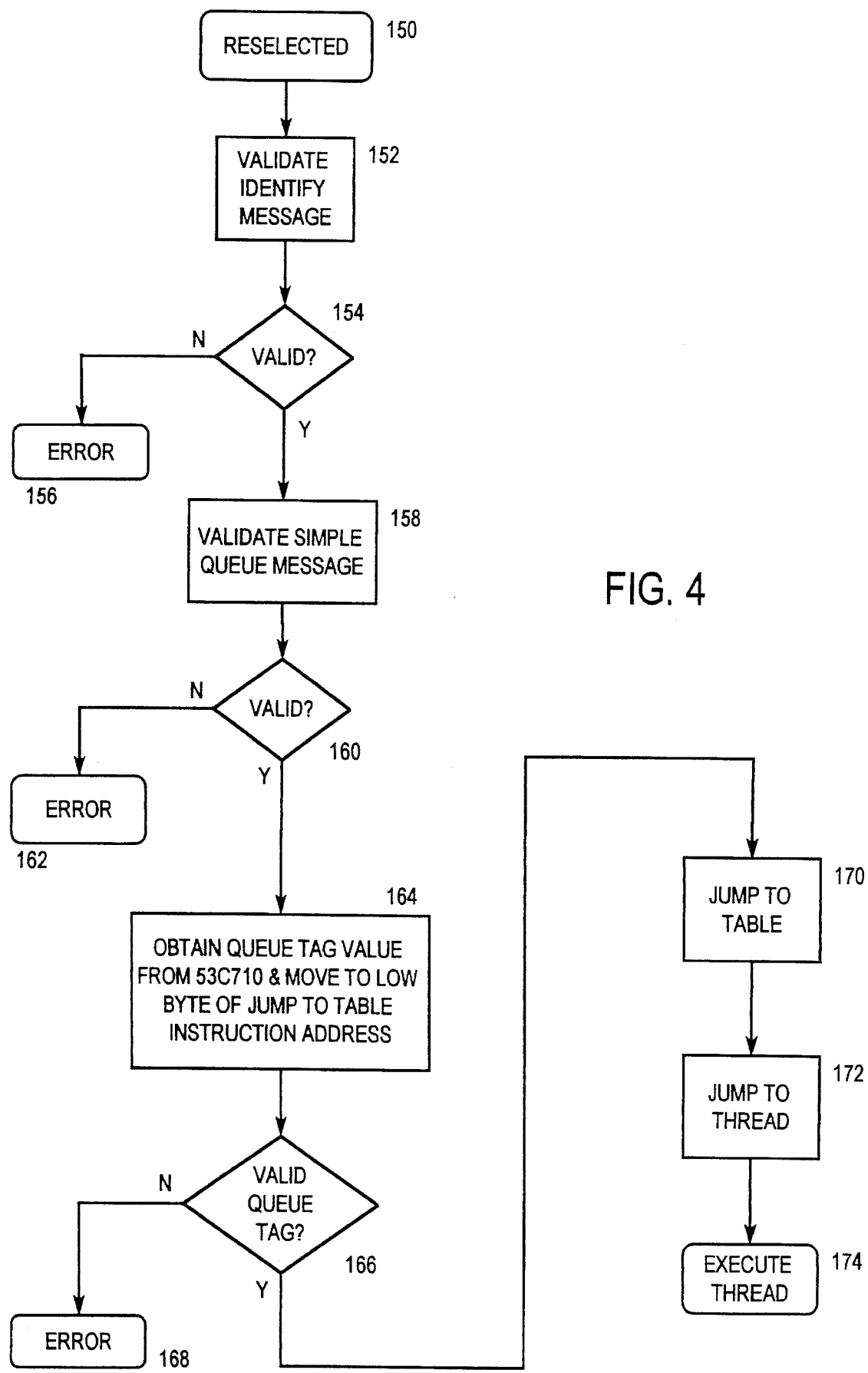
FIG. 4 is a flowchart diagram of operations of the SCSI controller for tagged queues according to the present invention.

The operation of the SCSI subsystem 70 upon reselection based on a target SCSI device returning information after disconnecting in a tagged queue situation are shown in FIGS. 3 and 4 and will be described first. FIG. 3 illustrates the operation according to the prior art. Upon receiving an indication that a reselection operation is occurring on the SCSI bus, the SCSI controller 74 initiates the reselection sequence 100. For purposes of this disclosure, the first operation in the reselection sequence 100 is step 102, where the identify message that is provided over the SCSI bus is validated to make sure that it is a proper message and intended for operation by the SCSI controller 74. If it is not a valid message as determined in step 104, control proceeds to step 106 where an error condition is generated. If the identify message is indeed valid, control proceeds from step 104 to step 108, where the SCSI controller 74 validates that a simple queue message according to the SCSI protocol and specification has been received from the target device. If in step 110 it is determined that a valid simple queue message was not received, control proceeds to step 112 where an error is generated. If a simple queue message was received, control proceeds to step 114, where a conditional branch instruction is executed to determine if the first queue tag has been received, indicating that the first thread was to be performed or the first queue was responding. If so, control proceeds to step 116, where operation branches to the particular thread instructions to be executed for that particular queue. If it was not the first queue, control proceeds from step 114 to step 118, where a test is made to determine if the second queue was responding. If so, control proceeds to step 120, where operation proceeds to perform and execute the instructions for that particular thread. As can be seen, control would ultimately proceed down to step 122 if no queue had been previously addressed to determine if the nth queue had been addressed. If so, control proceeds to step 124 where the nth thread would be executed. If not, control proceeds to step 126 and an error condition is indicated. As is clear from reviewing the flowchart, if numerous queues or threads are present, then operations are greatly slowed down because of the high number of conditional branching steps 114, 118, 122 and so on which are present. This therefore reduces the performance of the SCSI subsystem 70.

Proceeding now to FIG. 4, operations according to the present invention are shown. The SCSI controller 74 determines that a reselection operation is occurring. The reselected sequence 150 is commenced. As a first step 152, the identify message is again validated. In step 154, if the message is not valid, control branches to step 156 where an error is again generated. If it is valid, control proceeds to step 158, where the simple queue message is validated. Control proceeds to step 160 to determine the valid status. If not valid, control proceeds to step 162 where an error is indicated. Up to this time it is noted that the sequences and instructions are the same as in sequence 100. However, they differ from this point on. If the simple queue message is valid as determined in step 160, control proceeds to step 164, where the queue tag value is obtained from the appropriate register in the SCSI controller 74 and this single byte value is then moved and overwritten over the lowest byte of the address portion of a jump instruction into a jump table.

The jump instruction in the 53C710 SCSI processor is an 8 byte instruction, with the last 4 bytes indicating the 32 bit address in the host computer memory to which the jump or branch is to be taken. Thus by writing the low byte and aligning a jump table as will be described on a 256 byte boundary, this allows direct entry into the table. It is also noted that when the queue tags were assigned in the selection sequence (not shown), they were assigned in multiples of 8 corresponding to the length of the jump instruction in the 53C710. Thus by properly patching or overwriting this low byte or tag value directly as the low byte in the jump instruction and properly aligning the jump table, then the branch or jump instruction to be executed into the table leads directly to a jump instruction to the proper queue. The jump table is a series of 8-byte jump instructions, one for each possible queue or thread. These Jump instructions sequentially point to the next thread or queue, so that there are then 32 threads which can be co-pending, based on the one byte patch and 8 multiple requirement. Thus the patched jump instruction address leads directly to a second jump instruction in the jump table, which is the jump to the actual thread.

After patching or overwriting the address of the jump instruction in step 164, control proceeds to step 166 to determine if the queue tag is a valid value. This is done by determining that the least 3 bits of the tag value are 0 to indicate it is a multiple of 8. If it is not a valid queue tag, control proceeds to step 168 where an error is developed. If it is valid, control proceeds to step 170, which is the actual jump instruction which has been patched, whose execution results in a jump into the jump table. The next instruction which is executed is the actual jump instruction contained in the jump table, which is a jump to the proper queue or thread. This is performed at step 172. Control then proceeds to step 174 where the instructions of the desired thread are executed.

Therefore it can be seen that the number of instructions that must be executed to obtain entry into the desired queue or thread is greatly reduced, particularly as the queue or tag number increases. This results in greatly improved and performance of the SCSI subsystem 70.

Figure 5:
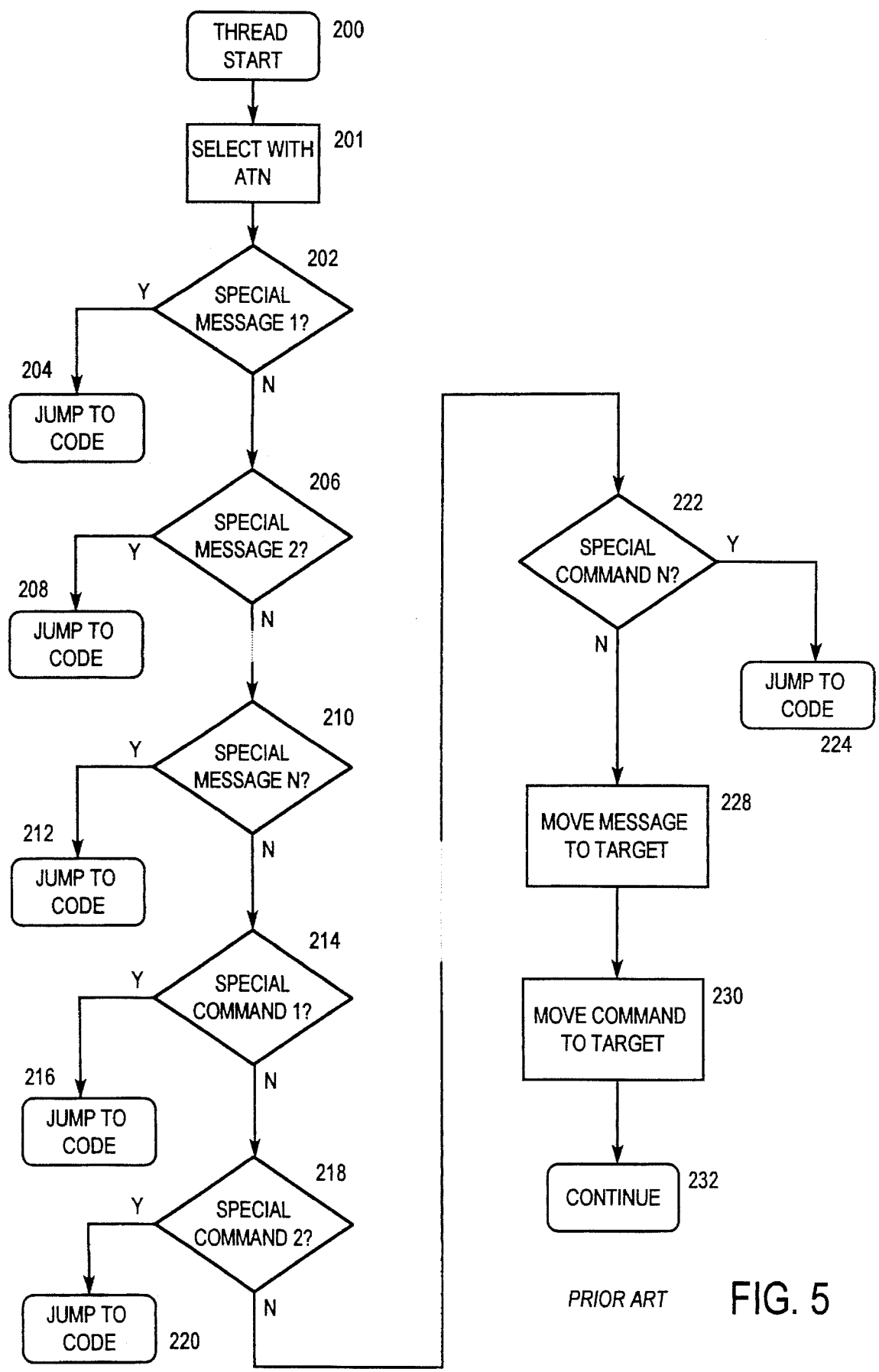
FIG. 5 is a flowchart of special case determination in the SCSI controller according to the prior art.

Proceeding now to FIGS. 5–9, operations for starting a particular thread and determining special cases are illustrated. FIG. 5 illustrates operation according to the prior art. An operation or thread is commenced at step 200. Control proceeds to step 201, which is an instruction to the SCSI controller 74 to perform a select with ATN or attention cycle so that the target device can be addressed. Control proceeds to step 202 where the SCSI controller 74 determines if this is a special message of a first type. If so, control proceeds to step 204, which is a branch to the particular instruction sequence necessary to perform operations of the special message, first type. If not, control proceeds to step 206 to determine if a second type of special message is present. If so, control proceeds to step 208 which is a branch to the particular code for that special message type. If not, control proceeds in this nature until step 210 is reach to determine if a nth type of special message has been requested. If so, control proceeds to step 212 which is the operational instruction sequence for the special message nth type.

If not, control proceeds to step 214 where a test is made to determine if the operation to be performed is a special command of a first type. If so, control proceeds to step 216, which is a branch to the instruction sequence for that command type. If not, control proceeds to step 218, which is a determination if the command is a second special type. If so, control proceeds to step 220 and that operation is performed. If not, control ultimately proceeds to step 222 to determine if the nth type special command is being requested. If so, control proceeds to step 224 where the operation is performed. If it was not a nth type special command as determined in step 222, this is an indication that it is a normal data transfer command and control proceeds to step 228. In step 228, the message in the particular SCSI operation is transferred to the target device and then to step 230 where the particular desired command is transferred to the target device. Operations then proceed in step 232.

As can be seen, depending upon the number of special messages and commands, this can be a very time consuming process. It is further complicated by the fact that this process must be performed for basically every operation of the SCSI subsystem 70, so that this particular path is highly time critical and is performed frequently, i.e. for every transfer operation. Therefore optimization in this sequence is even more critical than many others.

Proceeding now to FIG. 6, a portion of the host device driver sequence is shown. There are a number of entry points into the sequence, potentially one from each special case and one from the conventional case. These are shown as entries 250–262. The conventional case entry 250 proceeds to step 266, where the host device driver sets the command data block which is to be transmitted by the SCSI controller 74 to the device and sets up the pointers in host memory of the particular data or message which will be passed. Control then proceeds to step 268, where an operation or thread on the SCSI controller 74 is initiated. Control then proceeds to step 270, which is a return to indicate that the driver operation has been completed.

The special cases entries 252–262 all proceed to step 264, where the host device driver patches or alters the code or instruction sequence located in the main memory to be operated by the SCSI controller 74 so that the default message length to be sent by the SCSI controller 74 is 0. In the case of the 53C710, this is defined as an illegal instruction which will result in an interrupt. At the time the interrupt occurs the host device driver will be able to take detailed control of the actual sequence of operations. Control proceeds from step 264 to step 268.

Figure 7:
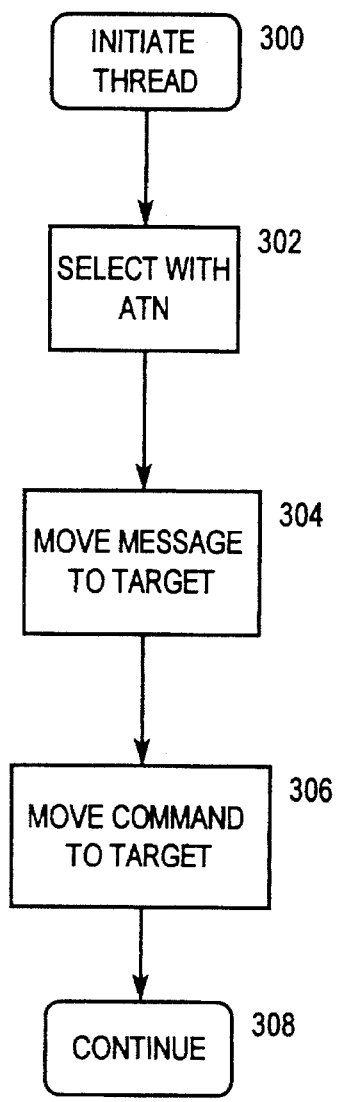
FIG. 7 is a flowchart of normal case operations of the SCSI controller according to the present invention.

Proceeding now to FIG. 7, normal operation of the SCSI controller 74 according to the present invention is shown. Control commences at the initiated thread sequence 300, where the SCSI controller 74 again performs its select with ATN command to obtain the attention of the target device. Control proceeds to step 304, where the desired message as indicated by the CDB developed by the host device driver is moved to the target device. Control then proceeds to step 306, where the desired command as indicated by the host device driver is passed to the target device. Control then proceeds to step 308 for further thread processing. Therefore it is noted that no branching has occurred, much in contrast to that shown in FIG. 5, where significant branching occurred before the final operations actually occurred in steps 226 to 230. Therefore as this operation or sequence must occur basically every time data is to be transferred, this new flow can be seen as a tremendous time reduction.

Figure 8:
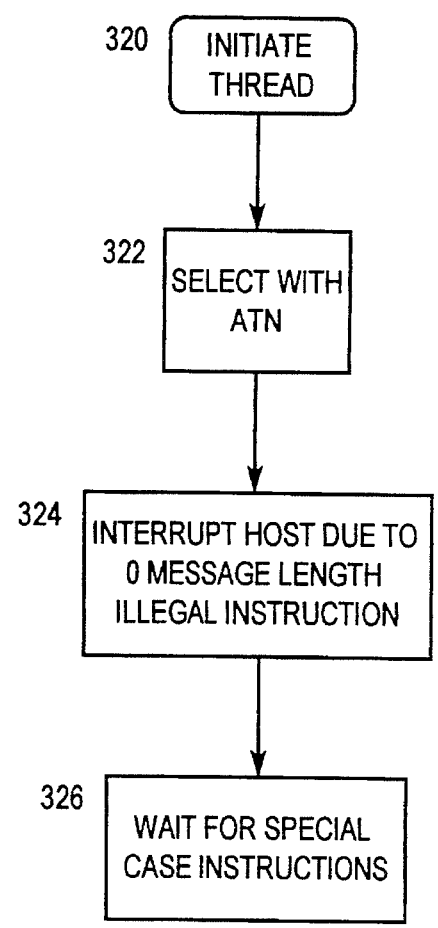
FIG. 8 is a flowchart of operations of the SCSI controller in a special case according to the present invention.

However, it is noted that occasionally special cases must be developed, with this operation shown in FIG. 8. An alternate initiated thread sequence 320 is illustrated. This is actually the same operational sequence located in the same location in the main memory 28 of the host computer as the sequence of FIG. 7, but operation will be slightly different because as noted in step 254 the host device driver patched the message instruction so that the message length was 0. The SCSI controller 74 executes step 322 where again the target device is selected with ATN. Control then proceeds to step 324, where the SCSI controller would obtain the message instruction to move a message to the target. However, in this case the message length as indicated in that instruction is 0, which is noted to be an illegal instruction. The 53C710 then sets an illegal instruction flag and interrupts the host processor. The SCSI controller 74 then basically stops executing the thread and waits for special instructions in step 326. Therefore the actual sequence has been aborted or terminated because of the illegal instruction. This is because the desired special case will be handled in a much more detailed level by the host device driver doing direct commands to the SCSI controller 74, not at a level where the SCSI controller performs these operations on its own according to a SCRIPTS sequence. This is the trade off in this particular portion according to the present invention but is considered to be highly desirable as it allows removal of the long conditional branching sequence as shown in FIG. 5 which is utilized in every operation. The number of special case messages or commands are very limited and very infrequently used, as compared to the conventional data passing commands, and so the tremendous gain as shown in FIG. 7 versus FIG. 5 greatly offsets the small loss developed by the longer time that is required to perform the special cases directly by the host device driver.

The host device driver operation after the SCSI subsystem 70 interrupt is shown in FIG. 9. As noted, when the illegal instruction is obtained, the SCSI controller 74 provides an interrupt to the computer system C. It is referred to as the 53C710 or SCSI controller interrupt and this causes execution of an interrupt sequence 350. Control proceeds to step 352, where the status register for the SCSI controller or 53C710 is read to allow determination of which particular interrupt or source caused the interrupt. Control proceeds to step 354 where a branching sequence is done to identify the source and to transfer to the particular software sequence needed to address the interrupt source. In this case, control proceeds to step 356 because this is an illegal instruction interrupt for purposes of this description. In step 356 the host device driver unpatches or corrects the message length portion of the message instruction in the SCSI controller code which had previously been changed to a 0 length. This results in a legal instruction so that processing of the SCSI controller 74 can again proceed according to FIG. 7. Control then proceeds to step 358, where the host device driver performs the special operation by causing the SCSI controller 74 to perform a series of small SCRIPTS sequences to accomplish the operation. This is understood to take slightly more time and resources of the host computer C as compared to allowing the SCSI controller 74 to perform these operations in parallel but, as noted above, the overall increase in performance of the SCSI subsystem 70 is greatly enhanced by the branching removal so that the tradeoff is considered very favorable. After the special operations have been completed, control proceeds to step 360, which is a return from the interrupt sequence and operations continue.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. A method for handling special operations in a SCSI environment, with a host processor, memory, and a SCSI processor, the method comprising the steps of:

preparing an instruction sequence in the memory, for the SCSI processor for conventional operations, the instruction sequence including instructions for selecting the target device, sending a message to the target device and sending a command to the target device;

the host processor receiving a request for a SCSI operation, determining that said request is for a special operation, and altering said prepared SCSI processor instruction sequence to include an illegal instruction;

the host processor initiating operation of the SCSI processor after altering said instruction sequence;

the SCSI processor commencing execution of the altered instruction sequence, determining the presence of illegal instruction and indicating the presence of said illegal instruction to the host processor;

the host processor receiving indication of said illegal instruction and unaltering said prepared SCSI processor instruction sequence to legal instructions; and the host processor causing the SCSI processor to perform the special operation after unaltering said illegal instruction.

2. The method of claim 1, wherein the step of altering said instruction sequence alters said message instruction.

3. The method of claim 2, wherein said message instruction is altered to indicate a zero length message.

\* \* \* \* \*